United States Patent
Lee et al.

(10) Patent No.: US 7,535,674 B2
(45) Date of Patent: May 19, 2009

(54) NARROW PITCH TAPE HEAD ARRAY USING AN ORTHOGONAL BACKGAP

(75) Inventors: Edward Hin Pong Lee, San Jose, CA (US); David John Seagle, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 373 days.

(21) Appl. No.: 10/976,475

(22) Filed: Oct. 29, 2004

(65) Prior Publication Data

US 2006/0050433 A1 Mar. 9, 2006

Related U.S. Application Data

(60) Provisional application No. 60/609,017, filed on Sep. 10, 2004, provisional application No. 60/609,009, filed on Sep. 9, 2004.

(51) Int. Cl.
    *G11B 5/127* (2006.01)
(52) U.S. Cl. .................................. 360/125.07
(58) Field of Classification Search ................. 360/126, 360/125.07, 125.12, 125.27, 125.67, 125.68, 360/125.69, 125.7, 317
    See application file for complete search history.

(56) References Cited

U.S. PATENT DOCUMENTS

| | | | | |
|---|---|---|---|---|
| 4,888,658 | A | * 12/1989 | Ono et al. | ..................... 360/126 |
| 4,916,802 | A | * 4/1990 | Matsuzawa | ............... 29/603.16 |
| 4,999,726 | A | * 3/1991 | Goto et al. | ............. 360/119.07 |
| 5,452,165 | A | 9/1995 | Chen et al. | |
| 5,546,650 | A | 8/1996 | Dee | |
| 5,796,564 | A | * 8/1998 | Shouji et al. | ................. 360/123 |
| 5,828,511 | A | 10/1998 | Bar | |
| 5,909,346 | A | * 6/1999 | Malhotra et al. | ............ 360/126 |
| 5,982,591 | A | 11/1999 | Folkerts et al. | |
| 6,236,525 | B1 | 5/2001 | Cates et al. | |
| 6,473,265 | B1 | * 10/2002 | Zhou et al. | ............. 360/125.53 |
| 6,650,496 | B2 | 11/2003 | Nozieres et al. | |
| 6,687,083 | B2 | 2/2004 | Hsiao et al. | |
| 6,909,579 | B2 | * 6/2005 | Lee et al. | ..................... 360/126 |
| 6,927,939 | B2 | * 8/2005 | Sasaki et al. | ........... 360/125.67 |
| 7,002,778 | B2 | * 2/2006 | Yazawa | ...................... 360/126 |

(Continued)

FOREIGN PATENT DOCUMENTS

EP 0178898 4/1986

(Continued)

OTHER PUBLICATIONS

Office Action, dated Jul. 10, 2007, U.S. Appl. No. 11/046,413.

(Continued)

*Primary Examiner*—Angel A. Castro
(74) *Attorney, Agent, or Firm*—Lorimer Labs; D'Arcy H. Lorimer

(57) ABSTRACT

The structure for a closely spaced, coplanar tape head array is disclosed. Narrow pitch is obtained by utilizing an orthogonal backgap structure, wherein the width of the backgap is less than the depth, thereby narrowing the footprint of individual head structures. The increased cross sectional area of the orthogonal backgap and revised yoke design ensure sufficient magnetic field strength at the write gap of each head.

12 Claims, 6 Drawing Sheets

U.S. PATENT DOCUMENTS

| | | |
|---|---|---|
| 7,070,698 B2 * | 7/2006 | Le ............................... 216/22 |
| 7,227,727 B2 * | 6/2007 | Santini ........................ 360/317 |
| 7,259,939 B2 * | 8/2007 | Sato ............................ 360/317 |
| 2002/0060879 A1 | 5/2002 | Sato |
| 2002/0135918 A1 | 9/2002 | Ozue et al. |
| 2003/0011922 A1 | 1/2003 | Nozieres et al. |
| 2003/0016474 A1 | 1/2003 | Biskeborn |
| 2003/0039067 A1 | 2/2003 | Hsiao et al. |
| 2004/0066579 A1 | 4/2004 | Yamanaka |
| 2005/0152066 A1 | 7/2005 | Yip |
| 2005/0152067 A1 | 7/2005 | Yip et al. |
| 2005/0201013 A1 | 9/2005 | Ozue |
| 2006/0050432 A1 | 3/2006 | Lee et al. |
| 2006/0050440 A1 | 3/2006 | Lee et al. |

FOREIGN PATENT DOCUMENTS

| | | | |
|---|---|---|---|
| JP | 01004910 A | | 1/1989 |
| JP | 01082315 | | 3/1989 |
| JP | 04137204 | * | 5/1992 |
| JP | 0425909 | | 11/1992 |
| JP | 06259717 | * | 9/1994 |
| JP | 08203024 | * | 8/1996 |
| JP | 2003338012 A | | 11/2003 |

OTHER PUBLICATIONS

Response to Office Action, dated Oct. 10, 2007.

\* cited by examiner

US 7,535,674 B2

NARROW PITCH TAPE HEAD ARRAY USING AN ORTHOGONAL BACKGAP

REFERENCES TO PRIOR APPLICATIONS

This application is related to co-pending provisional application, reference No. 60/609,017, filed Sep. 10, 2004, entitled NARROW PITCH TAPE HEAD ARRAY USING AN ORTHOGONAL BACKGAP; co-pending provisional application, reference No. 60/609,009, filed Sep. 9, 2004, entitled HEAD DESIGN WITH OVERLAPPING COIL FOR NARROW PITCH TAPE HEAD; and claims benefit of both thereof. Provisional applications Nos. 60/609,017 and 60/609,009 are hereby incorporated by reference in their entirety.

BACKGROUND OF THE INVENTION

1. Field of the Invention

This invention relates to the construction of magnetic media read and write heads. More specifically, the invention relates to the construction of multi-layer tape head arrays having a narrow pitch.

2. Description of the Related Art

A typical tape head consists of an array of writers and readers dispositioned across a row fabricated by thin-film wafer technology. The separation between adjacent elements in an array has constraints. Consequently adjacent elements stretch across multiple tracks written in the tape. Read and Write access to all tracks is achieved by indexing the array across the tape.

One limitation on the separation between elements is to allow space for a wide coil on each write head. The width of the coil is constrained by magnetic requirements on the backgap size, number of turns and state-of-the-art coil photolithography. These limitation impose a separation much wider than the write track width and tape track pitch.

FIG. 1 is a top view of a typical write head array 100 of the prior art, with insulating layers transparent to aid in viewing relevant details. Tape or other magnetic media contacts the head array at the air bearing surface (ABS) 112. Write heads 102a-102c are located at a distance 122 from each other, which is about the width of five tracks in the example shown. Track position is determined by the center of write gap 110 of write head 102. Track location diagram 114 shows the location of tracks 116a-116c, which correspond to the write track locations of heads 102a-102c, respectively. Distance 122 is primarily determined by the width 118 of backgap 106 in combination with the dimensions of coil 104. Conventional backgaps 106 of the prior art are generally constructed with a width 118 of significantly larger dimension than the depth 120. Yoke 108 returns the magnetic flux from write gap 110 to backgap 106.

FIG. 2 (prior art) is an air bearing surface (ABS) end view of tape head array 100 at section B-B in FIG. 1, with insulating layers 212 transparent to aid in viewing relevant details. Write heads 102a-102c are situated above shield layer 202 and insulating layer 204, respectively. Bottom pole layer 206 is situated above insulating layer and is common for all writes heads in the array. Bottom pole tip 208 is coupled to bottom pole layer 206. Upper pole tip 210 is separated from lower pole tip 208 by write gap 110. Upper pole tip 210 is coupled to yoke 108.

FIG. 3 (prior art) is a cross section view through section A-A of FIG. 1, with insulating layers transparent to aid in viewing relevant details.

U.S. Pat. No. 5,452,165 discloses a plurality of thin film magnetic heads which are arranged in a linear array with a spacing D between adjacent heads. The pole pieces of the magnetic heads are positioned in a side by side relationship in contrast to the normal pancake type of magnetic head. The linear array is angled at a skew angle theta with respect to the direction of travel of the magnetic medium. The track pitch is then D sin theta. The track width is substantially equal to the thickness of the pole tips P1T and P2T of the magnetic heads. This thickness can be in the order of 3 microns. With such a pole tip thickness the track pitch of each magnetic head in the linear array can be 3-4 microns. A plurality of narrow data tracks can then be provided with minimum pitch by a corresponding number of magnetic heads. The write signals are simultaneously fed to the heads or the read signals are simultaneously fed to the heads. This allows high data rates to be processed. The invention also provides different azimuth between adjacent heads to minimize cross talk between the tracks caused by track misregistration. Additional magnetic heads can be employed for servo control as needed.

U.S. Pat. No. 5,546,650 discloses a method of manufacturing a thin-film magnetic head having a write element capable of producing a magnetic flux density sufficient to write the high coercivity magnetic tapes at high track density. The manufacturing process requires a minimum number of lithographic steps, thereby increasing the yield of the multiple track magnetic head module. A trench is cut into the ferrite substrate material and filled with an insulator to produce a more efficient write element. A recess is then formed in the ferrite substrate having a geometry sufficient to hold a deposited thin-film conductive coil below the surface of the ferrite substrate. An insulator is then deposited on the ferrite substrate to form a gap spacer as well as to insulate the conductive thin-film coils from the ferrite substrate. The conductive thin-film coil is then deposited on the ferrite substrate in the recesses. A high-saturation flux density magnetic material is deposited on a planar nonmagnetic closure section and formed into separate magnetic pole pieces for each individual track. The magnetic pole pieces are then insulated from each other to produce a closure section having a planar surface matable with the ferrite substrate. The closure section is attached to the substrate by aligning the metal pole piece on the closure section is attached to the substrate by aligning the metal pole piece on the closure section. The magnetic pole piece is positioned in the front gap and has a width which defines the track width on the magnetic tape. The magnetic pole piece is also positioned to substantially cover the back gap region to increase the flux density existing at the front gap region.

U.S. Pat. No. 5,982,591 discloses integrated, juxtaposed head units of a magnetic head have transducing gaps directly adjacent a central plane transverse to the longitudinal direction of relative movement of a magnetic recording medium, adjacent transducing gaps being to opposite sides of the central plane. Head units adjoin each other so that a recording channel density of 100% is achieved. In one embodiment a common electrical conductor passes through a plurality of head units to one side of the central plane, and electrical connection tracks extending from a portion of the conductor form inductive transducing elements.

U.S. Pat. No. 6,650,496 discloses a matrix array of recording heads, wherein each head is independent from another both in terms of its magnetic circuit and excitation conductors. Each individual head has a planar magnetic circuit and an helical coil wrapped around the lower part of the magnetic circuit. The matrix array is collectively fabricated using full thin film technology on non-magnetic substrates. Preferably, the heads are aligned in an oblique lattice with the write gaps aligned along rows and offset by a constant value along columns. Each individual head is connected to the control electronics through interconnects to the backside of the wafer, allowing independent control of the write parameters. The die forming the device is shaped on its edges and top surface to optimize head/medium positioning and minimize wear.

U.S. Pat. No. 6,687,083 discloses a low profile inductive write head to improve track definition and head efficiency and to reduce overcoat and pole tip protrusion and cracking caused by thermal expansion. A first insulation layer of an insulation stack enclosing the coil layer is formed of an non-magnetic inorganic insulator material such as aluminum oxide, silicon dioxide or titanium dioxide having a thickness of in the range of 0.2-0.3 microns. The thinner first insulation layer results in a significantly reduced slope of the insulation stack which decreases reflective notching during processing of the second pole tip to improve track definition. Improved thermal conduction properties of the inorganic insulator material improves heat sinking of the write coil reducing overcoat and pole tip protrusion and cracking at the pole tip/write gap layer interface.

U.S. Patent Application Publication 2002/0135918 A1 discloses a multi-magnetic recording head capable of increasing a magnetic recording density of information recorded on a magnetic recording medium. The multi-magnetic recording head includes a substrate, a pair of first thin film magnetic poles with a specific gap put therebetween, which are stacked over the substrate, and a pair of second thin film magnetic poles with a specific gap put therebetween, which are stacked over the pair of first thin film magnetic poles, wherein the pair of first thin film magnetic poles and the pair of second thin film magnetic poles are offset from each other in the direction nearly perpendicular to the stacking direction.

U.S. Patent Application Publication 2004/0066576 A1 discloses a magnetic write head having a vertically laminated back gap structure and method of making the same. The magnetic head is formed with lower and upper pole pieces and a back gap structure which connects the lower and the upper pole pieces in a back gap region. In one illustrative example, the back gap is a vertically laminated structure having alternating layers of magnetic and non-magnetic materials. Each alternating layer is perpendicular to both the lower and the upper pole pieces. This vertically laminated structure significantly reduces the eddy currents in the back gap region at high operating frequencies as the layers are oriented in a direction parallel with the magnetic flux.

U.S. Patent Application Publication 2002/0060879 A1 discloses a thin film magnetic head having a plurality of coils is capable of recording with higher density. A magnetic pole section for restricting a track width is formed between a lower core layer and an upper core layer, and two coil layers are tiered between a reference surface and a lower core layer through the intermediary of a coil insulating layer. This allows a magnetic path to be shortened. As a result, narrower tracks and lower inductance can be both achieved, and the narrower tracks combined with faster data transfer enable higher-density recording to be attained.

Head arrays of the prior art having a relatively large spacing can exhibit a number of disadvantages. One is the possibility of track misregistration (TMR), which is an alignment or registration error from the first track position (i.e. 116*a*) to the last track position (i.e. 116*c*) due to expansion or contraction of the magnetic media. Magnetic media, particularly tape, can expand or contract as a function of temperature or humidity. The magnitude of this error is dependent on the total distance between the first and last head positions in the array, therefore the further the heads are apart, the greater the registration error. Another disadvantage of a widely spaced head array is that data write times can be longer for a given media width and number of tracks. Closely spaced heads produce arrays having more heads per unit media width, and therefore more tracks can be written in parallel, increasing total data rates to the storage media. This may be of considerable importance in computer data back-up applications, where large hard drives need to be backed up on tape media.

In order to reduce adjacent head to head dimension 122, some designs in the prior art have used a staggered head positioning, requiring adjacent heads to be located on different levels (when viewed in the ABS view). This construction can result in higher production costs, since proportionately more layers have to be added during fabrication.

Of value would be an invention that allows a reduction of the spacing between the elements in the array while maintaining the same number of elements. Location of all elements within the same horizontal plane would be desirable to reduce fabrication costs.

SUMMARY OF THE INVENTION

It is an object of the present invention to provide a magnetic head structure containing a lower pole, an upper pole, and a backgap structure magnetically coupling the lower pole and the upper pole. The backgap structure has a backgap depth greater than the backgap width.

It is another object of the present invention to provide a magnetic head structure containing a lower pole including a lower pole layer magnetically coupled to a lower pole tip, an upper pole including a yoke magnetically coupled to an upper pole tip, a write gap disposed between the lower pole tip and the upper pole tip at an air bearing surface, and a backgap structure magnetically coupling the lower pole layer and the yoke. The backgap structure has a backgap depth greater than the backgap width.

It is yet another object of the present invention to provide a magnetic head array containing a first magnetic head further containing a first lower pole including a lower pole layer magnetically coupled to a first lower pole tip, a first upper pole including a first yoke magnetically coupled to a first upper pole tip, a first write gap disposed between the first lower pole tip and the first upper pole tip at an air bearing surface, and a first backgap structure magnetically coupling the lower pole layer and the first yoke, the first backgap structure having a first backgap depth greater than a first backgap width. The magnetic head array further contains a second magnetic head including a second lower pole including the lower pole layer magnetically coupled to a second lower pole tip, a second upper pole including a second yoke magnetically coupled to a second upper pole tip, a second write gap disposed between the second lower pole tip and the second upper pole tip at the air bearing surface, and a second backgap structure magnetically coupling the lower pole layer and said second yoke, the second backgap structure having a second backgap depth greater than a second backgap width. The first magnetic head is adjacent to said second magnetic head.

BRIEF DESCRIPTION OF THE DRAWINGS

The present invention will be better understood when consideration is given to the following detailed description thereof. Such description makes reference to the annexed drawings, wherein.

DETAILED DESCRIPTION OF THE PREFERRED EMBODIMENTS

Figure 1:
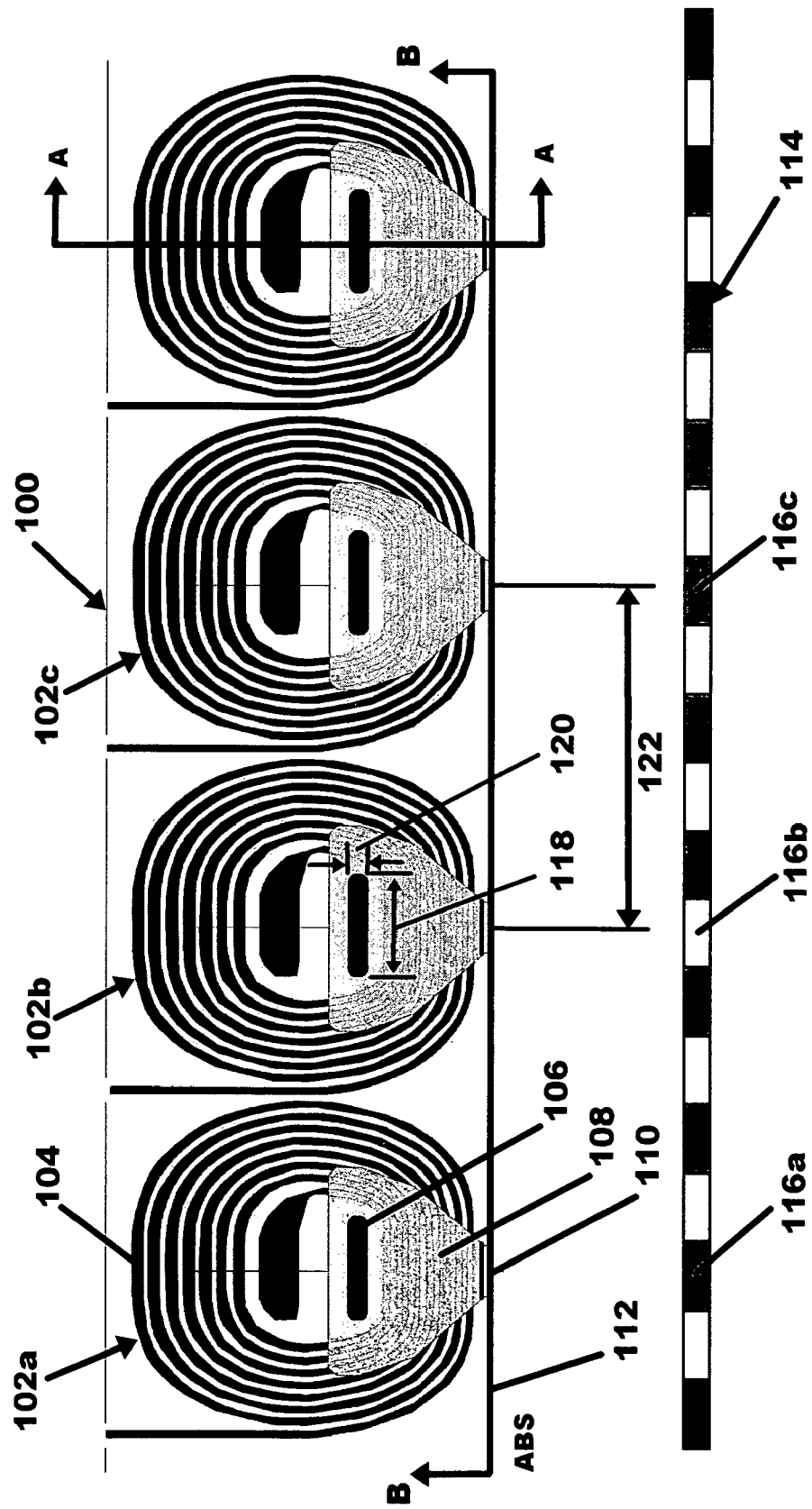
FIG. 1 (prior art) is a top view of a typical write tape head array with insulating layers transparent.
Figure 2:
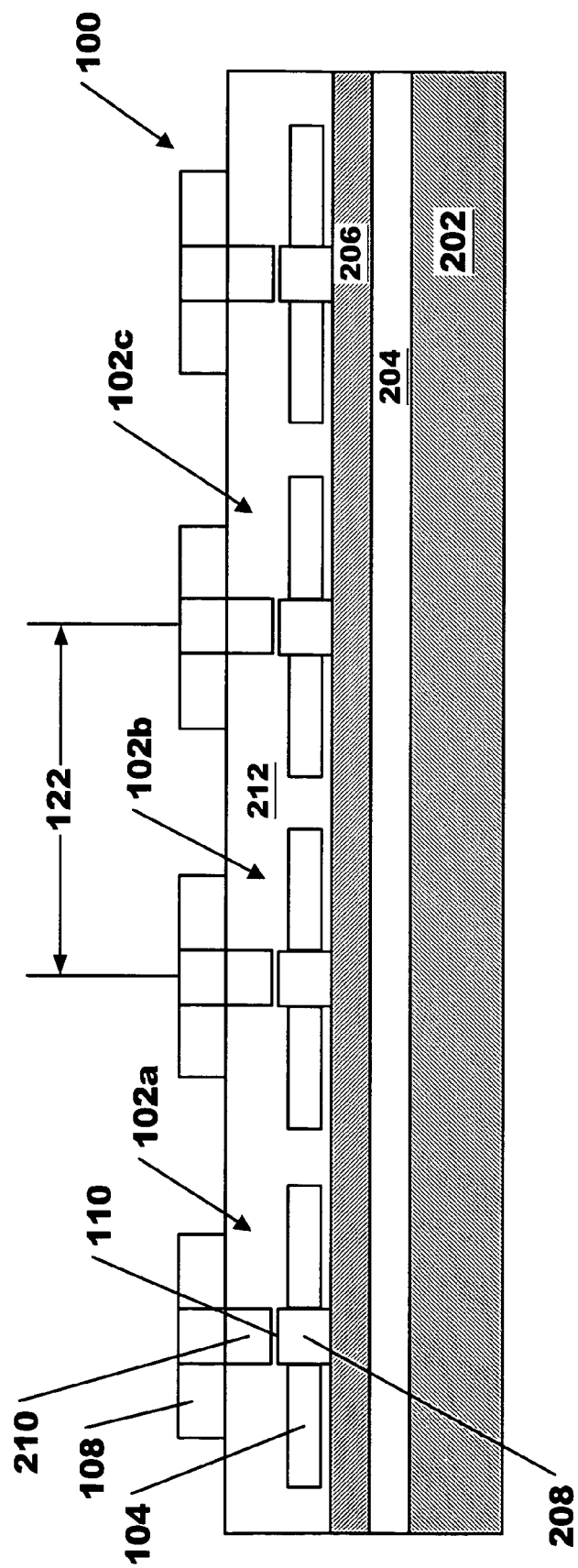
FIG. 2 (prior art) is an air bearing surface (ABS) end view at section B-B in FIG. 1, with insulating layers transparent.
Figure 3:
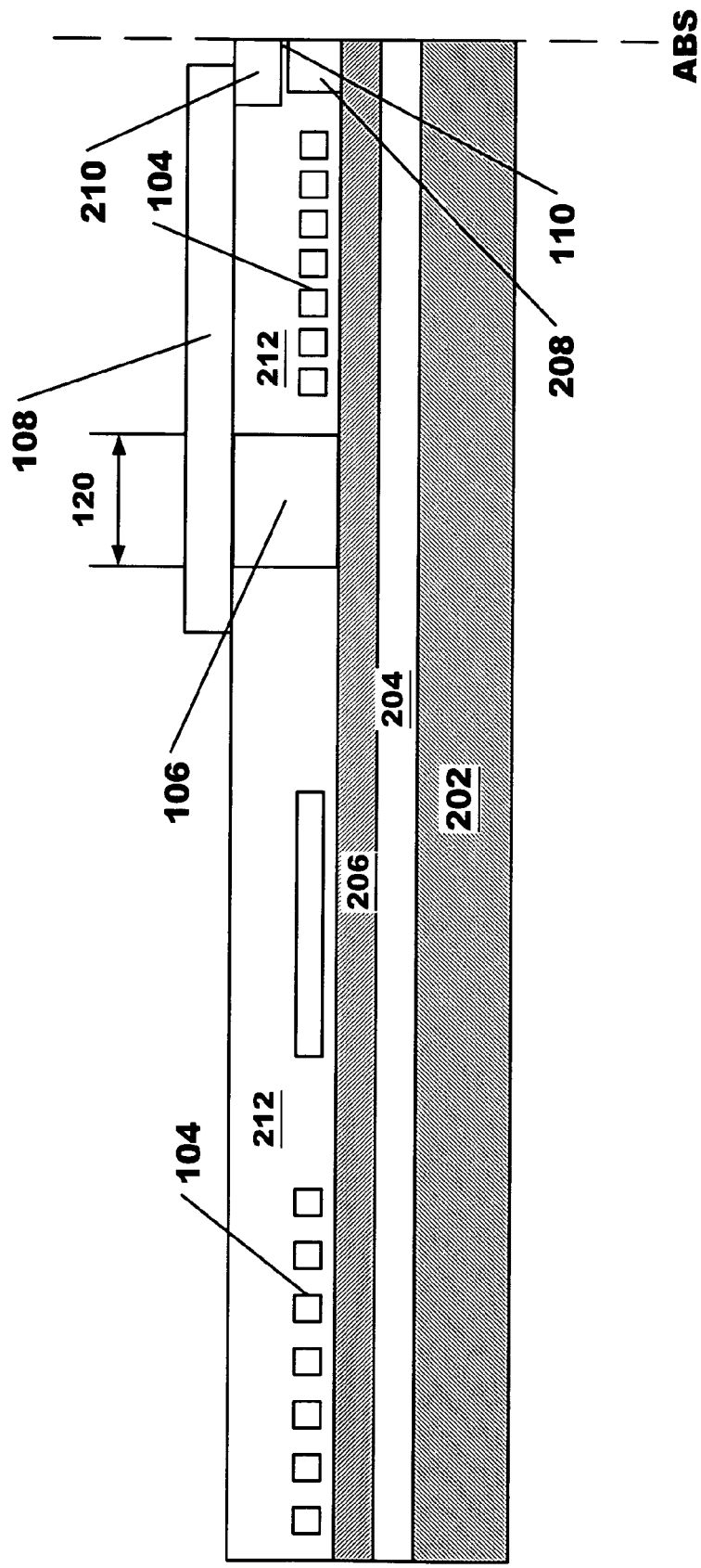
FIG. 3 (prior art) is a cross section view through section A-A of FIG. 1, with insulating layers transparent.

FIGS. 1-3 (prior art) have been discussed in the Background section above.

Figure 4:
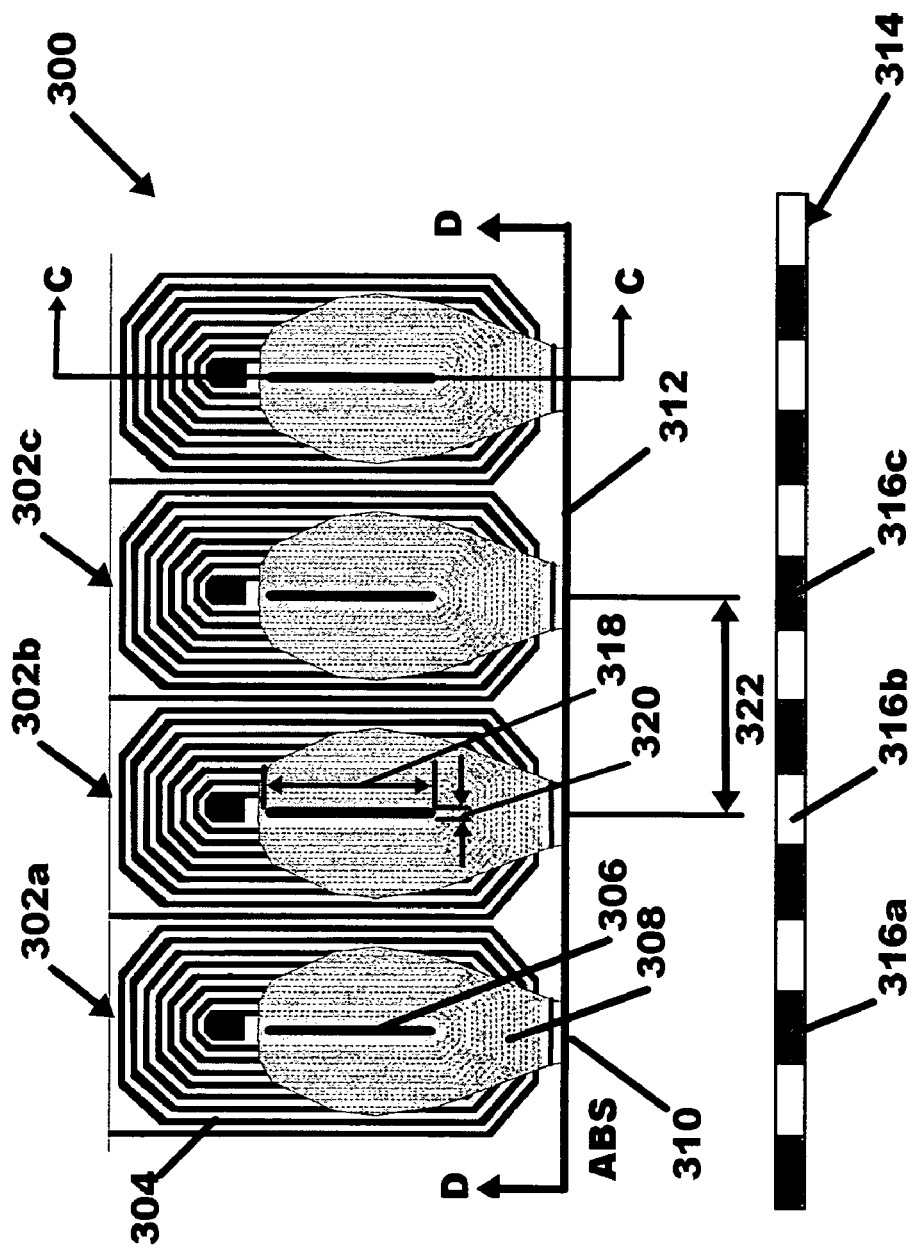
FIG. 4 is a top view of a write head array having orthogonal backgaps, with insulating layers transparent, according to an embodiment of the present invention.

FIG. 4 is a top view of a write head array 300 having orthogonal backgaps 306, with insulating layers transparent to aid in viewing relevant details, according to an embodiment of the present invention. Head to head dimension 322 has been reduced by rotating the conventional backgap 106 by 90 degrees so that backgap 306 has a width 320 much less than width 120, and a depth 318 much greater than depth 118 of the prior art design of FIG. 1. This allows compression of coil 304 and results in tighter head spacing. Backgap 306, in combination with yoke 308, provides adequate magnetic flux conductivity to write head gap 310 due in part to the larger cross sectional area of the backgap. The backgap 306 cross sectional area is roughly the width 320×the depth 318, which can be made equal to or greater than the conventional backgap 106 of the prior art. The shape of yoke 308 is also altered to enhance magnetic flux conductivity.

In the example embodiment shown in FIG. 4, write heads 302a-302c are located to write tracks 316a-316c on the track diagram 314. As shown, the head design of the present invention has a head to head spacing dimension 322 of three track widths. This is example is meant for illustration purposes, and does not imply any limitation on the actual head to head spacing achievable. Actual spacing would be determined by desired track widths and fabrication limits on coil geometry, such as those imposed by photolithography and metal deposition limitations.

Figure 5:
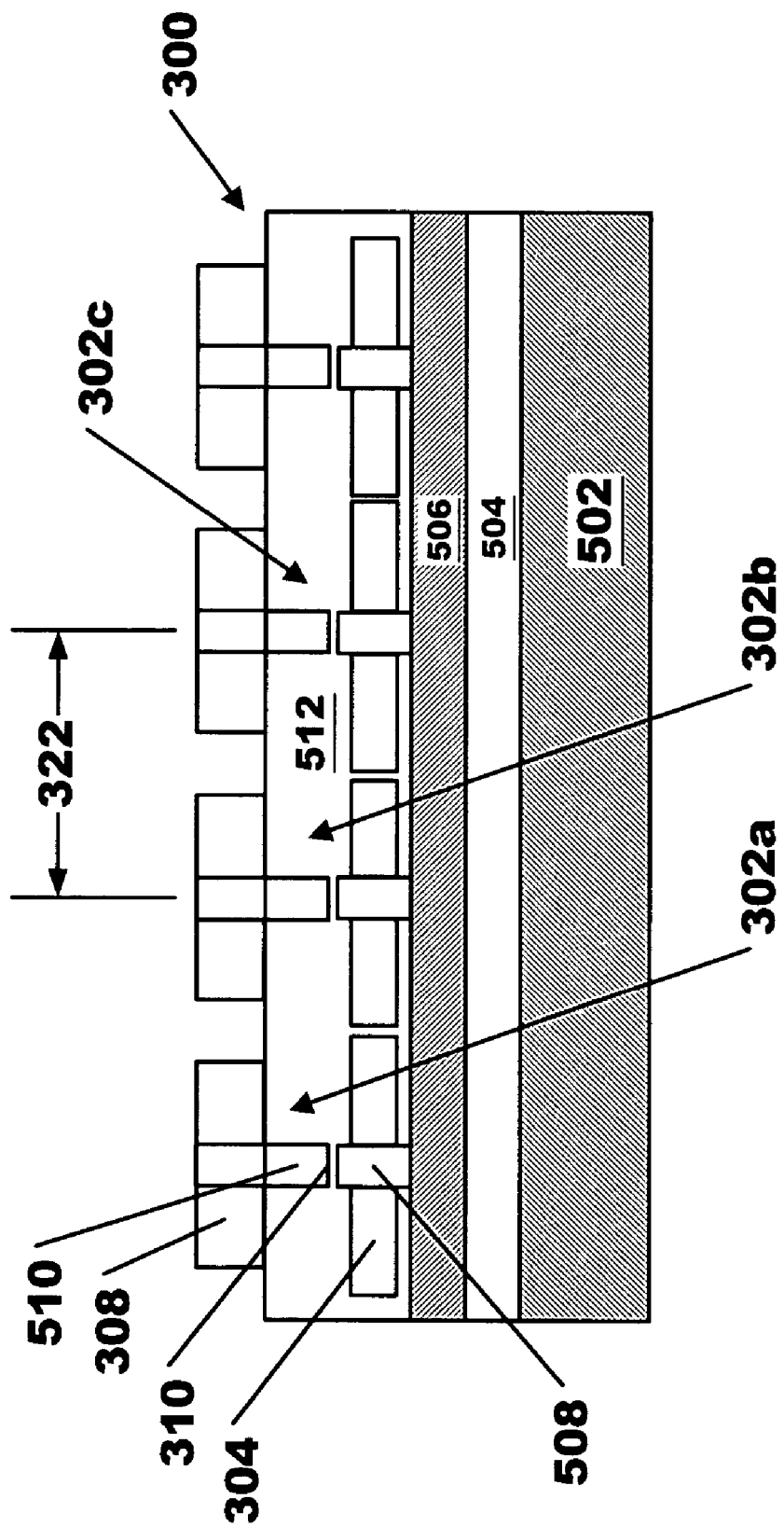
FIG. 5 is an air bearing surface (ABS) end view at section D-D in FIG. 4, with insulating layers transparent, according to an embodiment of the present invention; and, FIG. 6 is a cross section view through section C-C of FIG. 4, with insulating layers transparent, according to an embodiment of the present invention.

FIG. 5 is an air bearing surface (ABS) end view of tape head array 300 at section D-D in FIG. 4, with insulating layers transparent to aid in viewing relevant details, according to an embodiment of the present invention. Write heads 302a-302c are situated above shield layer 502 and insulating layer 504, respectively. Bottom pole layer 506 is situated above insulating layer 504 and is common for all writes heads in the array. In an alternative embodiment (not shown), bottom pole layer.may be separated into discreet, isolated sections for each of heads 302a-302c. However, it is still desirable that these sections be located in the same plane above layer 504 to simplify construction and reduce fabrication costs. Bottom pole layer 506 is in contact with bottom pole tip 508, and together comprise the lower pole. Upper pole tip 510 is in contact with yoke 308, and together comprise the upper pole. The upper pole tip 510 and lower pole tip 508 are separated by write gap 310, which is generally filled with a non-magnetic, insulator material. Upper pole tip 510, yoke 308, lower pole tip 508, and lower pole layer 506 may be any suitable magnetic material, preferably one having a high magnetic moment such as Permalloy or various compositions of NiFe or CoFe alloys, which may contain dopants or other additives known by those of ordinary skill in the art to provide desirable material properties. The specific material compositions of the upper pole tip 510, yoke 308, lower pole tip 508, and lower pole layer 506 may be different, in order to optimize the function of each component. Write gap 310 may be composed of alumina or other suitable non-magnetic material. Insulating material 512 may be composed of alumina, silica, baked photo-resist, or layers and combinations of any of the foregoing materials. Details are not shown for clarity.

Figure 6:
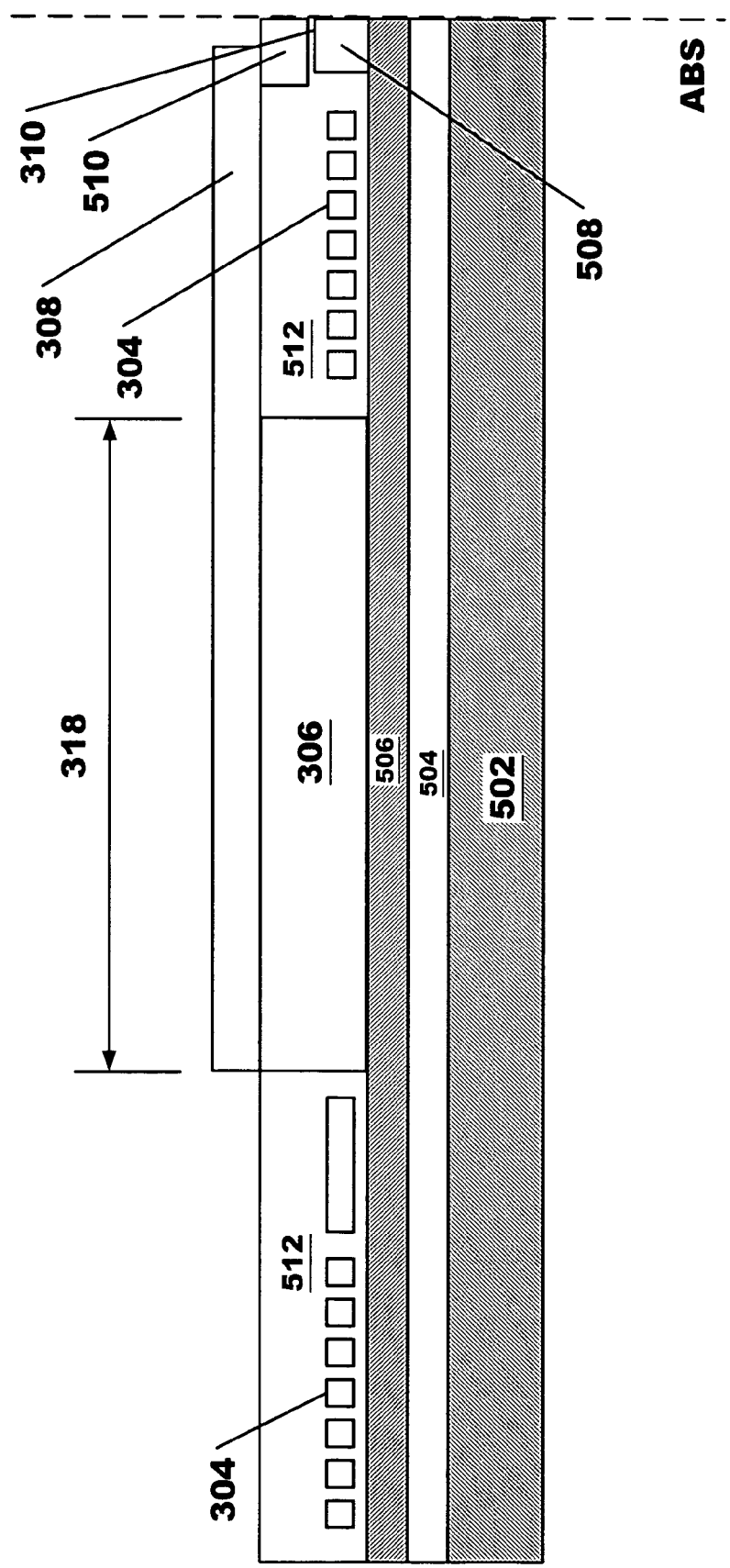

FIG. 6 is a cross section view through section C-C of FIG. 4, with insulating layers transparent to aid in viewing relevant details, according to an embodiment of the present invention. This view is taken through the center line axis of the write head perpendicular to the air bearing surface (ABS), and shows the extended depth 318 of the backgap 306 of the present invention. Backgap 306 is in contact with lower pole layer 506 and to yoke 308, thus effectively magnetically coupling the upper and lower poles. Fabrication of the various structures 304, 508, 510, 310, 306, and 308 are well known to those of ordinary skill in the art, and need not be covered in detail in this disclosure. Insulation 512 may be composed of various layers of different materials, deposited according to methods and processes well known to those skilled in the art.

The present invention is not limited by the previous embodiments heretofore described. Rather, the scope of the present invention is to be defined by these descriptions taken together with the attached claims and their equivalents.

What is claimed is:

1. A magnetic head structure, comprising:
    a lower pole;
    an upper pole; and,
    a backgap structure magnetically coupling said lower pole and said upper pole, said backgap structure having a backgap depth greater than two times a backgap width, wherein said magnetic head structure is a thin film head.

2. The structure as recited in claim 1, wherein said upper pole comprises a yoke magnetically coupled to an upper pole tip, said backgap structure being magnetically coupled to said yoke.

3. The structure as recited in claim 1, wherein said lower pole comprises a lower pole layer magnetically coupled to a lower pole tip, said backgap structure being magnetically coupled to said lower pole layer.

4. The structure as recited in claim 1, wherein
    said upper pole comprises a yoke magnetically coupled to an upper pole tip, said backgap structure being magnetically coupled to said yoke; and
    said lower pole comprises a lower pole layer magnetically coupled to a lower pole tip, said backgap structure being magnetically coupled to said lower pole layer.

5. The structure as recited in claim 4, wherein said upper pole tip and said lower pole tip are separated by a non-magnetic material.

6. The structure as recited in claim 1, wherein said backgap depth is greater than four times said backgap width.

7. A thin film magnetic head structure, comprising:
    a lower pole including a lower pole layer magnetically coupled to a lower pole tip;
    an insulating layer in contact with said lower pole layer;
    a shield layer in contact with said insulating layer, said shield layer approximately parallel to said lower pole layer;
    a coil structure having windings disposed in a plane approximately parallel to said shield layer;

an upper pole including a yoke magnetically coupled to an upper pole tip;

a write gap disposed between said lower pole tip and said upper pole tip at an air bearing surface; and, a backgap structure magnetically coupling said lower pole layer and said yoke, said backgap structure having a backgap depth greater than two times a backgap width, wherein at least a portion of the windings of said coil structure encircle said backgap structure.

8. The structure as recited in claim 7 wherein said backgap depth is greater than four times said backgap width.

9. The structure as recited in claim 7, wherein said write gap comprises a non-magnetic material.

10. A magnetic head array comprising:

a first thin film magnetic head further comprising
- a first lower pole including a lower pole layer magnetically coupled to a first lower pole tip,
- a first upper pole including a first yoke magnetically coupled to a first upper pole tip,
- a first coil structure having windings disposed in a plane approximately parallel to said lower pole layer,
- a first write gap disposed between said first lower pole tip and said first upper pole tip at an air bearing surface, and
- a first backgap structure magnetically coupling said lower pole layer and said first yoke, said first backgap structure having a first backgap depth greater than two times a first backgap width, wherein at least a portion of the windings of said first coil structure encircle said first backgap structure;

a second thin film magnetic head further comprising
- a second lower pole including said lower pole layer magnetically coupled to a second lower pole tip,
- a second coil structure having windings disposed approximately in said plane,
- a second upper pole including a second yoke magnetically coupled to a second upper pole tip,
- a second write gap disposed between said second lower pole tip and said second upper pole tip at said air bearing surface, and
- a second backgap structure magnetically coupling said lower pole layer and said second yoke, said second backgap structure having a second backgap depth greater than two times a second backgap width, wherein at least a portion of the windings of said second coil structure encircle said second backgap structure;

an insulating layer in contact with said lower pole layer; and, a shield layer in contact with said insulating layer, said shield layer approximately parallel to said lower pole layer, wherein said first thin film magnetic head is adjacent to said second thin film magnetic head.

11. The array as recited in claim 10, wherein said first write gap and said second write gap are approximately co-planar.

12. The array as recited in claim 10, wherein said first backgap depth is greater than four times said first backgap width, and said second backgap depth is greater than four times said second backgap width.

* * * * *